(12) United States Patent
Taylor

(10) Patent No.: US 8,959,094 B2
(45) Date of Patent: Feb. 17, 2015

(54) EARLY RETURN OF PARTIAL SORT RESULTS IN A DATABASE SYSTEM

(75) Inventor: Derek A. Taylor, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 52 days.

(21) Appl. No.: 12/850,445

(22) Filed: Aug. 4, 2010

(65) Prior Publication Data

US 2011/0295862 A1 Dec. 1, 2011

Related U.S. Application Data

(60) Provisional application No. 61/349,601, filed on May 28, 2010.

(51) Int. Cl.
*G06F 17/30* (2006.01)
*G06F 9/30* (2006.01)

(52) U.S. Cl.
CPC .................................... *G06F 9/30* (2013.01)
USPC ........................................................ 707/752

(58) Field of Classification Search
CPC .................. G06F 17/30982; G06F 17/30988
USPC ................................................ 707/752, 753
See application file for complete search history.

(56) References Cited

U.S. PATENT DOCUMENTS

| | | | | |
|---|---|---|---|---|
| 5,179,699 A | * | 1/1993 | Iyer et al. | 707/999.007 |
| 6,795,817 B2 | * | 9/2004 | Agarwal et al. | 707/999.002 |
| 2005/0004912 A1 | * | 1/2005 | Lewis et al. | 707/7 |
| 2008/0215584 A1 | * | 9/2008 | Furusho | 707/7 |
| 2009/0063458 A1 | * | 3/2009 | Beavin et al. | 707/5 |
| 2009/0063591 A1 | * | 3/2009 | Betten et al. | 707/205 |

OTHER PUBLICATIONS

Govindaraju et al. "GPUTeraSort: Hight Performance Graphics Co-processor Sorting for Large Database Management", Microsoft Technical Report MSR TR-20050185, Nov. 2005, Revised Mar. 2006, pp. 1-12.*
Nvidia GPU, "GPU Gems 2" GPU Gems—Chapter 46. Improved GPU Sorting, http://http.devel oper.nvidia.com/GPUGems2/gpugems2_chapter46.html, last accessed Jan. 9, 2013, 20 pages.
Wikipedia, "Bitonic Sort", http://en.wikipedia.org/wiki/Bitonic_sort, last accessed Jan. 9, 2013, 3 pages.

(Continued)

*Primary Examiner* — Khanh Pham
(74) *Attorney, Agent, or Firm* — Hickman Palermo Truong Becker Bingham Wong LLP

(57) ABSTRACT

As described herein, a database machine is provided with specialized hardware that can be used to accelerate the sort function. This hardware lowers the computation cost of performing a raw sort operation over the result rows. The hardware may be embodied in a direct circuit (e.g., ASIC), a programmable circuit (e.g., FPGA), a parallel compute engine (e.g., GPU) or any parallel computer. A hardware-assisted sort procedure provides for the early return of up to K results. This early return feature is critically valuable in database operations because often an entire result set is not required. For requests that require only the first L results, when L<=K the query can be satisfied with only a single pass over the data. The hardware- or GPU-assisted sort procedure, referred to herein as "scraper sort," may be based on modifications of well-known, existing parallel sort algorithms.

17 Claims, 3 Drawing Sheets

(56) References Cited

OTHER PUBLICATIONS

Wikipedia, "Merge Sort", http://en.wikipedia.org/wiki/Merge_Sort, last accessed Jan. 9, 2013, 6 pages.

Wikipedia, "Batcher odd-even Mergesort", http://en.wikipedia.org/wiki/Batcher_odd-even_mergesort, last accessed Jan. 9, 2013, 2 pages.

Wikipedia, "Shellsort", http://en.wikipedia.org/wiki/Shell_sort, last accessed Jan. 9, 2013, 5 pages.

D.E. Knuth. The Art of Computer Programming, vol. 3: Sorting and Searching, Third Edition. Addison-Wesley, 1998. ISBN 0-201-89685-0. Section 5.3.4: Networks for Sorting, pp. 219-247.

* cited by examiner

EARLY RETURN OF PARTIAL SORT RESULTS IN A DATABASE SYSTEM

RELATED APPLICATIONS

This application claims the benefit of U.S. Application No. 61/349,601 entitled "Hardware-Assisted Sort for Database Operations," filed May 28, 2010, incorporated herein by reference.

BACKGROUND

1. Field of the Invention

The present application relates to database processing, more particularly to the sort function in database processing.

2. State of the Art

Sort is a fundamental operation in databases. Query requests for data often require data to be ordered based on some criterion. When a query request requires an order based on a criterion that is not already provided in some existing database index, the database planner must decide between two alternatives: 1.) Create an index (perhaps temporarily) to be used to compute the ordering. 2.) Sort the result rows as they are computed by applying the desired ordering criterion. The present application addresses the second option, which is often a good option when some combination of the following conditions apply: 1.) It is known that a particular query ordering is not likely to be re-used soon. 2.) The overhead of the index is high.

Often database sort requests only require the first L results; nevertheless, existing mechanisms require the data to be fully sorted before any results can be returned.

SUMMARY

As described herein, a database machine is provided with specialized hardware that can be used to accelerate the sort function. This hardware lowers the computation cost of performing a raw sort operation over the result rows. The hardware may be embodied in a direct circuit (e.g., ASIC), a programmable circuit (e.g., FPGA), a parallel compute engine (e.g., GPU) or any parallel computer. A hardware-assisted sort procedure provides for the early return of up to K results. This early return feature is critically valuable in database operations because often an entire result set is not required. For requests that require only the first L results, when L<=K the query can be satisfied with only a single pass over the data. The hardware- or GPU-assisted sort procedure, referred to herein as "scraper sort," may be based on modifications of well-known, existing parallel sort algorithms.

BRIEF DESCRIPTION OF THE DRAWING

The present invention may be further understood from the following description in conjunction with the appended drawing. In the drawing.

DETAILED DESCRIPTION

Figure 1:
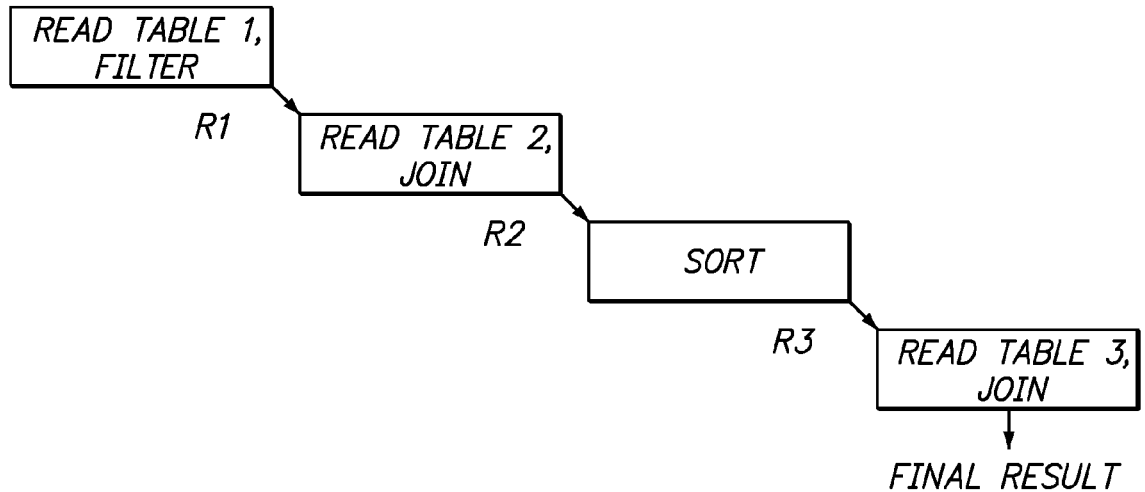
FIG. 1 is a diagram illustrating processing flow of an example database query.

In the following description, for purposes of explanation, specific nomenclature may be set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of serial and parallel steps leading to a desired result. The steps are those requiring manipulations of physical quantities.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specifically constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms, processes, and methods presented herein are not inherently related or restricted to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Generally speaking, the scraper sort is a hardware- or GPU-based parallel procedure for producing a fully-sorted subset of size K of a large data set of size N with only a single pass over the data. With each pass over the data, the scraper produces a fully-sorted result set of size K and ((N/K−1))

locally-sorted result sets The locally-sorted result sets, while requiring additional passes to merge them together before the final result set can be produced, are at least guaranteed to follow the K fully-sorted results in the overall ordering. Thus, the scraper provides for the early return of up to K results as compared to other sorting mechanisms. Other mechanisms require the data to be fully sorted before any results can be returned. This early return feature is critically valuable in databases because often an entire result set is not required. For requests that only require the first L results, when L<=K the query can be satisfied with only a single pass over the data.

Of course, if an index exists that provides the desired ordering, the result set can be returned with a single pass over the data. However, the index costs space in the database. It also costs time to build if it does not yet exist. The availability of the scraper sort may reduce the cost of sorting so that a query plan which might otherwise build an index would opt for the sort instead. With the scraper sort, sort is cheaper than an index in many cases, saving both time and space in the database.

Early return is also critical for distributed database systems. Database operations sometimes require a sort of results on one machine before the data can be transmitted across a network to another system for further processing. Early return allows the sender to begin transmitting much earlier than if it had to wait for the complete result set to be sorted. This allows downstream operations to proceed in parallel in pipelined fashion, which increases the throughput of the system.

Referring to FIG. 1, a diagram is shown illustrating processing flow of an example database request, such as an SQL query. In a first processing stage, a read and filter operation is performed with respect to a first table, Table 1. An intermediate result R1 is communicated to a second processing stage in which a read operation is performed with respect to a second table, Table 2, followed by a join operation. An intermediate result set R2 is communicated to a third processing stage in which the result set R2 is sorted. An intermediate result set R3 is communicated to a fourth processing stage in which a read operation is performed with respect to a third table, Table 3, followed by a join operation, thereby producing a final result set.

The early return feature described herein may be applied to the sort operation of the third processing stage in the present example, with the result that up to K results may be returned to the fourth processing stage prior to completion of sorting, enabling work of the fourth processing stage to proceed in pipelined fashion. As a result, the fourth processing stage may in turn provide early final results to the requestor. If such early results are sufficient to satisfy the request, then a termination control signal may be communicated to the processing stages, either in parallel or in ripple fashion from the last processing stage backward, resulting in termination of further processing of the request.

Scraper Sort Components

Figure 2:
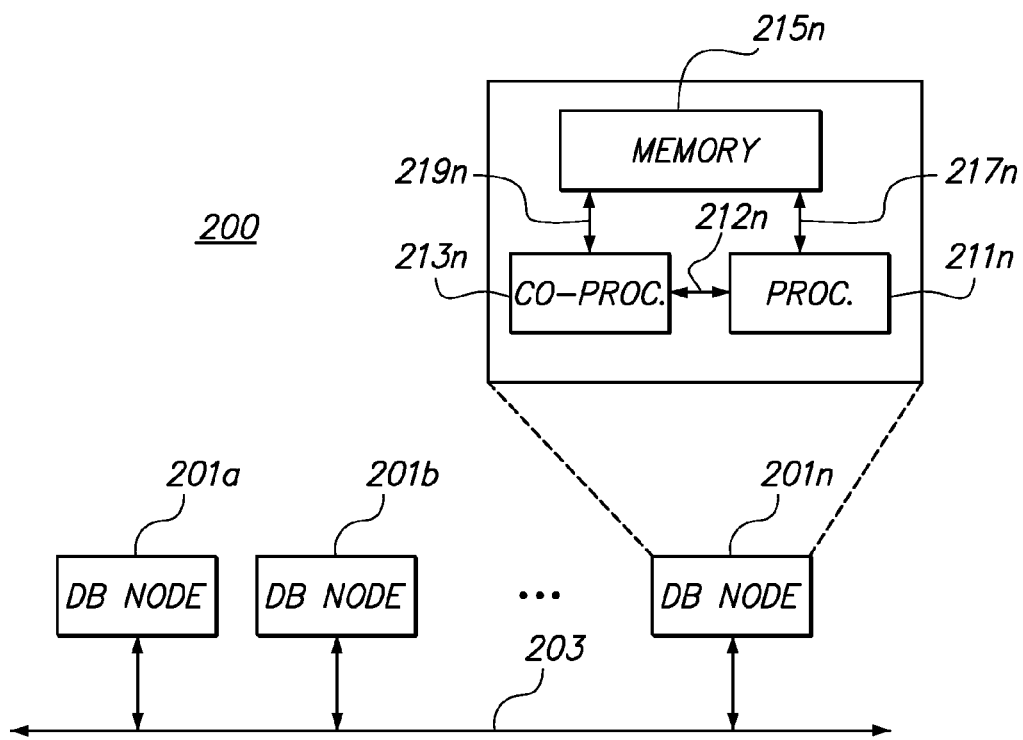
FIG. 2 is a block diagram of a portion of a database system.

In an exemplary embodiment, the scraper sort may be implemented using three component blocks: a sort block, a merge block, and a scraper block. These blocks may each be implemented, for example, as a direct hardware circuit (FPGA, ASIC, etc.), in software on a parallel computer such as a GPU, etc. Referring to FIG. 2, a block diagram is shown of a portion of an exemplary database system 200. The database system 200 shown is a distributed database system having multiple database nodes 201*a*-201*n* coupled to a communication medium 203 such as a bus, backplane, network segment, etc.

A database node 201*n* is illustrated in further detail. A database processor 211*n* is coupled via a bus 212*n* to a database co-processor 213*n*. Both the database processor 211*n* and the database co-processor 213*n* are coupled to memory 215*n* via buses 217*n*, 219*n*, and may be coupled to the same memory or to different memories. This distributed database configuration is merely exemplary of various configurations may be used to implement a database node of a distributed database system. Furthermore, the present application should be understood as being applicable to database systems generally, whether distributed or not distributed.

In operation, the processor 211*n* offloads sort operations to the co-processor 213*n*, the hardware configuration of which typically enables it to perform sorting orders of magnitude faster than the processor 211*n*. For purposes of the present scraper sort, the co-processor 213*n* may be used to implement the sort, merge and scraper blocks of the scraper sort as described herein.

For the sort block, any of a variety of known, commonly-used, efficient sorting networks may be employed. In general, such networks have a number of comparators of the order $O(n \log(n)^2)$. Examples of suitable sorting networks are set forth in the following table:

| SORTING NETWORK(S) | REFERENCE |
|---|---|
| Batcher Odd-Even Merge Sort | http://en.wikipedia.org/wiki/Batcher_odd-even_mergesort |
| Various | D. E. Knuth. The Art of Computer Programming, Volume 3: Sorting and Searching, Third Edition. Addison-Wesley, 1998. ISBN 0-201-89685-0. Section 5.3.4: Networks for Sorting, pp. 219-247 |
| Nvidia GPU | http://http.devel-oper.nvidia.com/GPUGems2/gpugems2_chapter46.html |
| Bitonic Sort | http://en.wikipedia.org/wiki/Bitonic_sort |
| Shell Sort | http://en.wikipedia.org/wiki/Shell_sort |
| Merge Sort | http://en.wikipedia.org/wiki/Merge_Sort |

A sort block can also be used as a merge block. A more optimal merge block can be obtained by reducing the sort network down to just that portion necessary for the merge. For example, the Batcher Odd-Even Merge Network can be reduced to half the size of the corresponding sort network. Note that this reduction of the network size does not change the complexity of the merge network, which remains $(n \log (n)^2)$.

Figure 3:
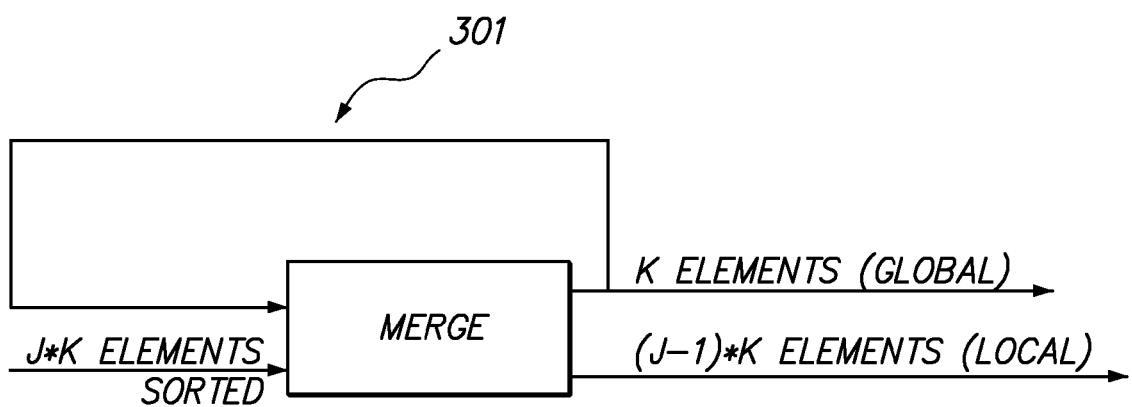
FIG. 3 is a diagram of a scraper sort stage.
Figure 4:
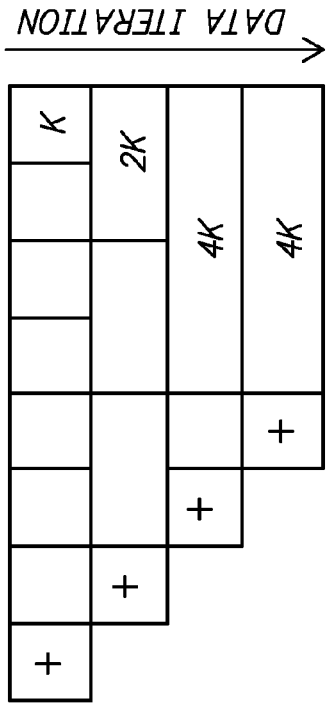
FIG. 4 is a diagram illustrating operation of a conventional merge sort.

Referring to FIG. 3, a scraper block 301 may be implemented as a merge block provided with additional state that maintains the first K elements of the sorted list in an internal buffer and feeds those elements back to participate in each subsequent sort operation together with J*K incoming sorted elements. Since the scraper contains state, it can be initialized to Empty. The Empty state is one in which all the output values from the scraper are empty. Any scraper register value that contains Empty will always assume the value of any new input value that arrives. The scraper 301 outputs K elements that are globally sorted over the combination of the incoming elements and the K globally sorted elements previously stored in the scraper 301. It outputs (J−1)*K elements that are locally sorted. The locally sorted elements are the elements remaining from the combination of the incoming elements and the K globally sorted elements previously stored in the scraper 301 after the globally sorted elements have been separated.

Scraper Sort Usage

The scraper sort may be further understood by way of contrast with a conventional merge sort. As illustrated in FIG.

4, a merge sort orders data in O(n log(n)) comparison operations by sorting progressively larger blocks of a large data set.

Figure 5:
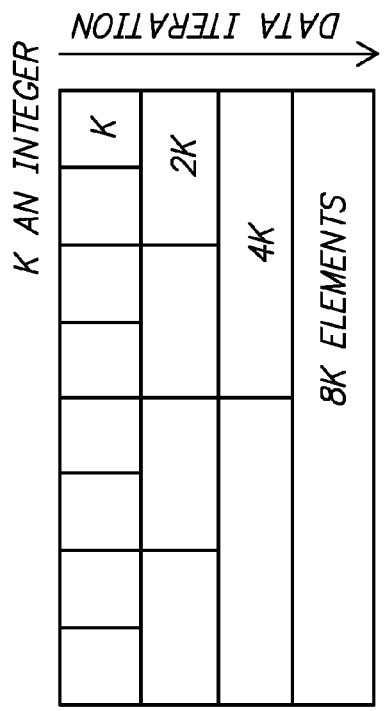
FIG. 5 is a diagram illustrating operation of the present scraper sort.

As illustrated in FIG. 5, by contrast, in the case of the scraper sort, at each pass, K globally-sorted results are returned and removed from further processing. Assume there are N total items to sort, and that the merge network can sort K items in parallel. Although the figures show N always an integer multiple of K, this algorithm is not limited to that case. The last block in any pass can be some number of items less than K without impacting the overall procedure. Each block represents a sorted subset of the full set of N items. Each block marked with a plus sign represents realized results that can be forwarded. The scraper sort "scrapes off" the top K elements from the final result with each pass of the data. At the time of the final pass, much of the sorted result set will have already been forwarded. Following the final pass, the remainder of the sorted result set is forwarded.

Figure 6:
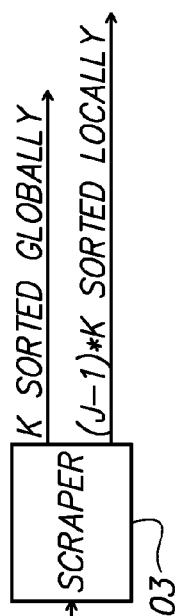
FIG. 6 is a diagram illustrating a first pass of a scraper sort.
Figure 7:
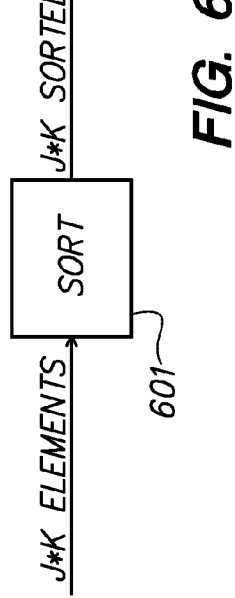
FIG. 7 is a diagram illustrating second and subsequent passes of a scraper sort.

FIGS. 6 and 7 show how the scraper sort is executed on the specified components. Referring to FIG. 6, during a first pass of the scraper sort, J*K elements are applied to a sort stage 601, resulting in J*K sorted elements. These J*K sorted elements are applied to a scraper stage 603, which produces K elements sorted globally and (J−1)*K elements sorted locally. After the first pass of the scraper sort, a set of K elements is forwarded as the first K sorted results. For the rest of the data, the sort continues in a separate pass over the data. The sort completes when all the data is sorted or it receives a cancel operation. There are J blocks of K sorted elements after the first pass. Referring to FIG. 7, in subsequent passes, there are M groups of merged results that have L elements each, where L is some integer i times K. The integer i is the current pass count, the first pass being numbered 1. In the second pass (i=2), for example, two groups of M sorted elements are input to a merge block 701, resulting in 2M sorted elements. These 2M sorted elements are applied to a scraper stage 703, which produces a second set K(2) of K elements sorted globally and 2M−K elements sorted locally.

Various ones of the blocks of FIGS. 6 and 7, such as the scraper block 603 and the scraper block 703, may use the same hardware components, and there is nothing to prevent all of the blocks from using the same reconfigurable hardware components.

Procedure Steps

One exemplary embodiment of a scraper sort procedure is as follows:

1. Initialize scraper block to "Empty."
2. Pass N items into the Sort network in N/K steps, producing N/K locally sorted blocks of K elements.
3. For each of the locally sorted blocks of K elements pass them through the scraper block as they are emitted from each pass in Step 2 to produce 1 globally sorted block of K elements and N/K−1 sorted blocks of K elements.
4. Forward first set of K results from scraper block to receiver.
5. Initialize scraper block to "Empty" again.
6. Pass all locally sorted blocks in pairs through the merge block and stream sorted results through the scraper, producing 1 globally sorted block of K elements and locally sorted buffers of exponentially increasing size.
7. Forward next K results from scraper block to receiver.
8. Repeat from step: Initialize scraper block to "Empty" again until only a single locally sorted buffer is produced.
9. Forward the locally sorted buffer as the rest of the result elements.

Particular embodiments of the present disclosure can take the form of an entirely hardware embodiment, an entirely software embodiment or an embodiment containing both hardware and software elements. In a particular embodiment, the disclosed methods are implemented in software that is embedded in a processor readable medium and executed by a processor, which includes but is not limited to firmware, resident software, microcode, etc.

Further, embodiments of the present disclosure can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

From the foregoing description, it will be understood that the described database systems, database processing methods, sorting stages, etc., may be employed to advantage to increase database throughput at modest additional cost. The early return feature described is critically valuable in databases because often an entire result set is not required. Early return is also critical for distributed database systems requiring a sort of results on one machine before the data can be transmitted across a network to another system for further processing. Early return allows the sender to begin transmitting much earlier than if it had to wait for the complete result set to be sorted. This allows downstream operations to proceed in parallel in pipelined fashion, which increases the throughput of the system.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A database system comprising:
   a processor;
   a co-processor coupled to the processor, the co-processor having a hardware configuration to perform sorting operations faster than said processor, the co-processor being configured to:
     commence a sort operation of a data set in response to instructions from the processor by:
       initially sorting the data set into a current set of locally sorted subsets, and
       performing a first scraper sort iteration that generates a first globally-sorted partial result set and a set of remaining locally-sorted subsets based on a single pass over the current set of locally sorted subsets;
     return the first globally-sorted partial result set;
     until an instruction is received to discontinue the sort operation, continue the sort operation by performing one or more additional scraper sort iterations comprising:
       performing a merge iteration comprising pairwise merging one or more pairs of a most recent set of remaining locally-sorted subsets to generate a set of merged subsets in a single pass,
       before any next merge iteration, performing an additional scraper iteration based on the set of merged subsets to generate an additional globally-sorted partial result set and a new set of remaining locally-sorted subsets, and
       returning the additional globally-sorted partial result set.

2. The database system of claim 1, wherein the instruction to discontinue the sort operation comprises a termination control signal.

3. The database system of claim 1, wherein the first scraper sort iteration and any additional scraper iterations are performed, at least in part, by a scraper block configured to maintain K elements, wherein the first globally-sorted partial result set and any additional globally-sorted partial result set include up to K elements.

4. The database system of claim 1, wherein any merge iterations are performed, at least in part, by a merge block configured to merge two locally sorted subsets to generate a merged locally sorted subset.

5. The database system of claim 4, wherein the merge block is further configured to implement a scraper block by maintaining K elements in an internal buffer.

6. The database system of claim 1, wherein the processor communicates the instructions to the co-processor when a query request requires an order based on a criterion that is not provided in an existing index, and when an estimated cost of sorting is lower than an estimated cost of building a new index.

7. A distributed database system comprising:
   a plurality of database nodes, each database node of the plurality of database nodes comprising a processor and a co-processor coupled to the processor;
     wherein the co-processor has a hardware configuration to perform sorting operations faster than said processor;
   wherein the co-processors of at least a subset of the plurality of database nodes are configured to:
     commence a sort operation of a data set by:
       initially sorting the data set into a current set of locally sorted subsets, and
       performing a first scraper sort iteration that generates a first globally-sorted partial result set and a set of remaining locally-sorted subsets based on a single pass over the current set of locally sorted subsets;
     return the first globally-sorted partial result set;
     until an instruction is received to discontinue the sort operation, continue the sort operation by performing one or more additional scraper sort iterations comprising:
       performing a merge iteration comprising pairwise merging one or more pairs of a most recent set of remaining locally-sorted subsets to generate a set of merged subsets in a single pass,
       before any further merge iteration, performing an additional scraper iteration based on the set of merged subsets to generate an additional globally-sorted partial result set and a new set of remaining locally-sorted subsets, and
       returning the additional globally-sorted partial result set.

8. The distributed database of claim 7, wherein the instruction to discontinue the sort operation comprises a termination control signal.

9. The distributed database system of claim 7, wherein the first scraper sort iteration and any additional scraper iterations are performed, at least in part, by a scraper block configured to maintain K elements, wherein the first globally-sorted partial result set and any additional globally-sorted partial result set include up to K elements.

10. A method comprising:
    commencing, in response to instructions from a processor handling a query request, a sort operation of a data set in at least one co-processor by:
      initially sorting the data set into a current set of locally sorted subsets, and
      performing a first scraper sort iteration that generates a first globally-sorted partial result set and a set of remaining locally-sorted subsets based on a single pass over the current set of locally sorted subsets;
    returning the first globally-sorted partial result set;
    until an instruction is received to discontinue the sort operation, continuing the sort operation by performing one or more additional scraper sort iterations comprising:
      performing a merge iteration comprising pairwise merging one or more pairs of a most recent set of remaining locally-sorted subsets to generate a set of merged subsets in a single pass,
      before any further merge iteration, performing an additional scraper iteration based on the set of merged subsets to generate an additional globally-sorted partial result set and a new set of remaining locally-sorted subsets, and
      returning the additional globally-sorted partial result set.

11. The method of claim 10, wherein the at least one co-processor is distributed across two or more nodes in a distributed database system.

12. The method of claim 10, wherein the instruction to discontinue the sort operation comprises a termination control signal.

13. The method of claim 10, wherein the first scraper sort iteration and any additional scraper iterations are performed, at least in part, by a scraper block configured to maintain K elements, wherein the first globally-sorted partial result set and any additional globally-sorted partial result set include up to K elements.

14. A non-transitory computer-readable medium comprising instructions for:
commencing, in response to instructions from a processor handling a query request, a sort operation of a data set in at least one co-processor by:
initially sorting the data set into a current set of locally sorted subsets, and
performing a first scraper sort iteration that generates a first globally-sorted partial result set and a set of remaining locally-sorted subsets based on a single pass over the current set of locally sorted subsets;
returning the first globally-sorted partial result set;
until an instruction is received to discontinue the sort operation, continuing the sort operation by performing one or more additional scraper sort iterations comprising:
performing a merge iteration comprising pairwise merging one or more pairs of a most recent set of remaining locally-sorted subsets to generate a set of merged subsets in a single pass,
before any further merge iteration, performing an additional scraper iteration based on the set of merged subsets to generate an additional globally-sorted partial result set and a new set of remaining locally-sorted subsets, and
returning the additional globally-sorted partial result set.

15. The non-transitory computer-readable medium of claim 14, wherein the at least one co-processor is distributed across two or more nodes in a distributed database system.

16. The non-transitory computer-readable medium of claim 14, wherein the instruction to discontinue the sort operation comprises a termination control signal.

17. The non-transitory computer-readable medium of claim 14, wherein the first scraper sort iteration and any additional scraper iterations are performed, at least in part, by a scraper block configured to maintain K elements, wherein the first globally-sorted partial result set and any additional globally-sorted partial result set include up to K elements.

* * * * *

UNITED STATES PATENT AND TRADEMARK OFFICE
CERTIFICATE OF CORRECTION

| | | |
|---|---|---|
| PATENT NO. | : 8,959,094 B2 | Page 1 of 1 |
| APPLICATION NO. | : 12/850445 | |
| DATED | : February 17, 2015 | |
| INVENTOR(S) | : Taylor | |

It is certified that error appears in the above-identified patent and that said Letters Patent is hereby corrected as shown below:

In the specification

In column 6, line 45, delete "Modems." And insert -- Modems, --, therefor.

Signed and Sealed this
Twenty-fourth Day of November, 2015

Michelle K. Lee
*Director of the United States Patent and Trademark Office*